Figure 1:
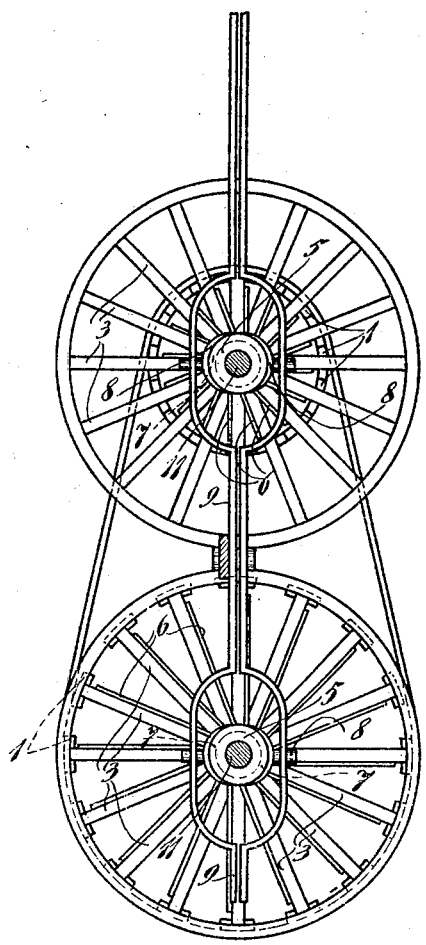

Jan. 13, 1925.

N. A. W. BACKMAN 1,523,241

PULLEY WITH VARIABLE DIAMETER

Filed Aug. 5, 1924  2 Sheets-Sheet 1

INVENTOR
Nils A. W. Backman
BY
ATTORNEYS

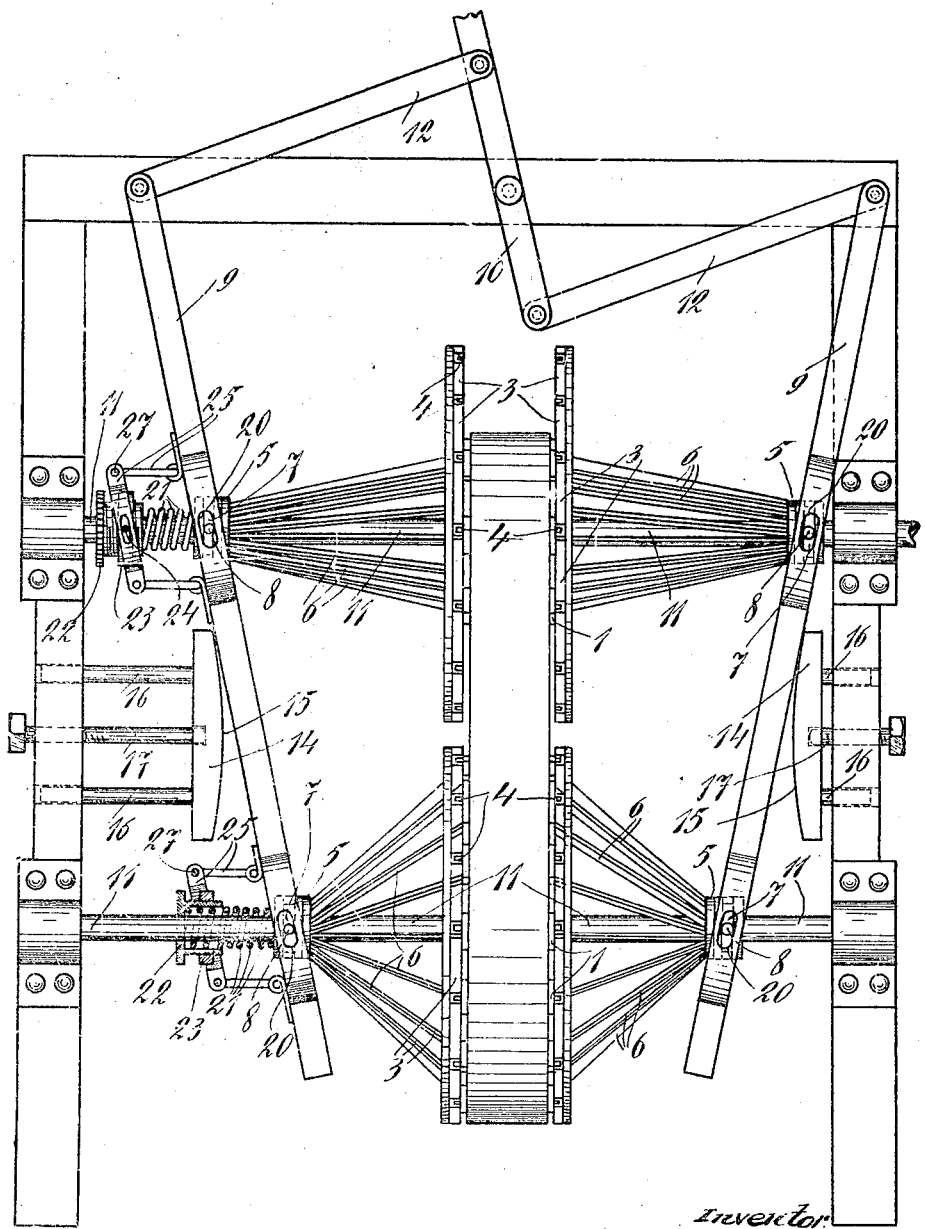

Patented Jan. 13, 1925.

1,523,241

UNITED STATES PATENT OFFICE.

NILS AXEL WILHELM BACKMAN, OF STOCKHOLM, SWEDEN.

PULLEY WITH VARIABLE DIAMETER.

Application filed August 5, 1924. Serial No. 730,174.

*To all whom it may concern:*

Be it known that I, NILS AXEL WILHELM BACKMAN, a subject of the King of Sweden, and resident of Bondegatan 61–63, Stockholm, in the Kingdom of Sweden, have invented certain new and useful Improvements in or Relating to Pulleys with Variable Diameters, of which the following is a specification, reference being had therein to the accompanying drawings.

This invention relates to a pulley, the diameter of which may be varied, which pulley consists of a number of segments adapted to be moved towards and away from the shaft upon which the pulley is mounted, and the invention has for its object to simplify the construction of the pulley, so that it may be manufactured at a low cost and at the same time will be quite safe in operation owing to the absence of parts which easily get out of order. The invention consists of a device for moving the segments whereby to vary the diameter of the pulley and also of devices for equalizing variations in the tension of the belt.

Two pulleys according to this invention and adapted to cooperate are shown in the accompanying drawings, where Fig. 1 is a side view and Fig. 2 is a plan view of the pulleys.

In the drawings 1 denotes the segments of the pulley. According to this embodiment these segments are mounted between radial spokes 3 attached to the shaft, and their ends are movable in slots 4 in said spokes, so that the segments may be moved towards and away from the shaft. The segments are T-shaped and their cross-pieces are so dimensioned that all the cross-pieces together form a close circular rim for the belt, when the segments are brought to their innermost position. On the shaft is mounted on each side of the pulley a sliding sleeve or ring 5, and by means of arms 6 arranged in the same way as umbrella-ribs, this sleeve is joined to the segments. Each sleeve 5 has as usual a peripheral groove for a loose ring 7 or the like, which has the same diameter as said sleeve, and is provided with two diametrically opposite extending pins 8 engaging grooves 20 each in one portion of the two arm levers 9, one on each side of the pulleys. The fulcrum for the said levers are provided by supports 14 the cam faces 15 of which being convexed inwardly by which a rocking pivot for the controlling levers is provided, the pivotal point changing its position longitudinally during adjustment of the mechanism. The arrangement of said supports which forms a very important feature of this invention is described below. The two levers 9 joined by rods 12 to a shifting lever 10 in such a way that the sleeves 5 on each shaft 11 may be moved towards or away from one another by means of said lever 10 and, consequently, in the first case the segments are moved outwards and in the second case they are moved inwards. As will be seen from the drawings the diameter of the pulleys will be altered in opposite directions by setting the lever 10, whereby the tension of the driving belt remains unaltered. By means of the shifting lever 10 it is possible to obtain every speed of the shaft to be driven relatively to the driving-shaft, the lever 10 being of course adjustable in every position wanted. By means of a suitable device not shown in the drawings the shifting lever 10 may be kept in the position corresponding to the requisite speed of the shaft to be driven. When the pulleys are rotating the speed is changed as easily as when they are at rest.

When using pulleys for less power one lever 9 may be omitted and all the arms of the sleeve 5 situated on one side of the pulley, may be omitted, too. Instead of radial spokes 3 side pieces provided with slots for the segments and the arms 6, may be used. The adjusting lever 10 may obviously be connected to any ordinary device for operating the same in such machines where the workman has his hands occupied.

The pins 8 of one of the levers may be given a certain amount of lost motion in the slots 20, and by providing a yielding connection between the lever and the respective sleeve 5. Thus a spring 21 is threaded on the shaft 11 outside the sleeve 5, said spring being pressed against the sleeve by means of a nut 22 screwed into a ring 23; this ring is connected by a pin 24 with a stirrup 25 which is articulated to the lever 9, and provided with a joint 27 so that it may adjust itself according to the different positions of the lever, it being evident that the spring 21, nut 22, and the ring 23 will be pushed along the shaft 11 by the adjustment of said lever. By screwing the nut into the ring 23 for a greater or less distance the tension of the spring 21 may be varied and regulated. Of course the other lever 9 may be connected with its associated sleeve by an identical device. Owing to the mobility of the segments described above the centrifugal force also gets an opportunity of adjusting the segments for equalizing the variations in the tension of the belt.

The supports 14 above mentioned are provided partly for balancing the weight of the segment adjusting mechanism so that the resistance to be overcome during such adjustment will be reduced, and partly for obviating the variations in the tension of the belt during such adjustment. It should be understood that by the words weight or resistance is chiefly meant the friction between the segments and their guides and little or no regard need be paid to the other forces acting upon the device because they practically neutralize each other.

When viewing the pulleys according to Figs. 1 and 2 it is to be noted that the resistance to the movement of the sleeves 5 cooperating with each other, is altered inversely as the diameter of the pulley or, explained more particularly, the angle of every arm 6 to the shaft 11 and the resistance to the adjustment of two cooperating pulleys are smallest when the segments occupy a position wherein the pulleys have the same diameter. In this position of the segments the sliding movement of the sleeves 5 requires equal power, too. However, as the relation between the arms of every lever 9 in the embodiment first described is not constant during the total swinging movement of the lever, the resistance to the adjustment will obviously vary considerably. For the same reason the diameter of one pulley is not altered quite inversely proportionally to the diameter of the other pulley in all the positions of the segments, which causes the variations mentioned above in the tension of the belt. In the embodiment according to Fig. 2 said inconveniences are obviated.

In this embodiment the fulcrum for every lever 9 consists of a member 14 mounted in suitable way, for instance on the frame supporting the pulleys, said member forming an arched surface for the lever which rests and rocks against said surface during its swinging movement, so that the pivot axis of the lever is moved along the surface from one end of the same to the other one. As will be seen from the drawing the distance between said pivot axis and the point of the sleeve 5 at which the force acts is smallest when the sleeve occupies its outmost position, that is, when the resistance to the movement of the sleeve is greatest, and inversely. Thus, every arm of the lever will be lengthened at decreasing resistance and shortened at increasing resistance. Ensuring from this, the fulcrum of the lever is situated midway between the two sleeves 5 that is midway between the shafts 11, when the segments are in the position at which the resistances of the sleeves are of equal amounts. By means of an exactly determined shape of the surface 15 it is also possible to obviate entirely variations in the tension of the belt at changing speeds.

In order to facilitate the accurate adjustment of the members 14 relatively to the respective levers 9 said members are adapted to be adjusted preferably in a direction towards and away from one another either manually for instance by means of guide-pins 16 mounted in the frame and a screw 17.

In addition to its simple construction the pulley has the advantage of being balanced exactly, so that its centre of gravity will be located on the shaft in the perpendicular middle plane of the pulley relatively to the shaft. In consequence of this arrangement the pulley is able to rotate at the highest speed without causing any additional strains in the shaft or any jerking movements in the belt or the ropes.

The pulley may obviously be used in many different ranges. Owing to its simple construction it will be cheap in manufacturing and, consequently, it can be mounted on all working-machines where varying speeds are wanted. By using a plurality of ropes the pulley may also be used for transmission of power on a large scale. Further, it may be used in motor vehicles and be substituted for the usual gearing device.

Having now described my invention, what I claim as new and desire to secure by Letters Patent is:

1. In motion transmitting devices including a pair of expansible pulleys, a two-armed lever for operating said pulleys to increase or decrease the circumferences thereof, on one or both sides of the pulley, the provision of a fulcrum support for said lever, said support having a suitable arch-shaped surface of contact upon which the lever is adapted to rock while being adjusted, whereby the point of contact may move along the said surface, the respective arm of the lever being lengthened when the circumference of the associated pulley increases, and the said arm being shortened when the circumference decreases.

2. A motion transmitting device as set forth in claim 1 characterized by the fulcrum support being adjustable.

In witness whereof, I have hereunto signed my name.

NILS AXEL WILHELM BACKMAN.